United States Patent [19]

Lemieux et al.

[11] 4,351,206
[45] Sep. 28, 1982

[54] ELECTRONIC AND HYDRAULIC CONTROL SYSTEM FOR AUTOMATIC GEAR CHANGE TRANSMISSION

[75] Inventors: George E. Lemieux; Tom T. Tibbles, both of Livonia, Mich.

[73] Assignee: Ford Motor Company, Dearborn, Mich.

[21] Appl. No.: 143,997

[22] Filed: Apr. 28, 1980

[51] Int. Cl.³ .......................... F16H 3/74; B60K 41/04
[52] U.S. Cl. .................................... 74/866; 74/752 A
[58] Field of Search ....................... 74/752 A, 861–867

[56] References Cited

U.S. PATENT DOCUMENTS

| | | | |
|---|---|---|---|
| 3,737,108 | 2/1976 | Will | 74/866 |
| 3,776,048 | 12/1973 | Enomoto et al. | 74/866 |
| 3,813,964 | 6/1974 | Ichimura et al. | 74/866 |

FOREIGN PATENT DOCUMENTS 653148  3/1979  U.S.S.R. ................................ 74/866

*Primary Examiner*—Lawrence J. Staab

*Attorney, Agent, or Firm*—Frank G. McKenzie; Donald J. Harrington

[57] ABSTRACT

A manual selector valve, whose setting is controlled by the vehicle operator, distributes flow from a fluid pump to an ON-OFF valve and to a hydraulic clutch which on being engaged disposes the transmission for forward drive. Two ON-OFF valves act as pressure distributors and enable the manual valve to overrule the operation of the automatic shift valves. The state of two solenoid-actuated valves is determined by an electrical signal received from a microprocessor that receives operational information and has stored within its memory logic that controls the signals. If the electronic control system should fail, the state of the solenoid valves is determined hydraulically and mechanically thus permitting complete functional response as the operator manually displaces the selector valve. A variable force solenoid actuates a line pressure regulator valve, which cooperates with a solenoid pressure regulator valve to reduce line pressure. A pressure modulator valve directs manual valve outlet flow to the solenoid valves, which function as shift valves.

11 Claims, 3 Drawing Figures

FIG.3

| MANUAL VALVE RANGE | TRANSMISSION OPERATING MODE | ON/OFF VALVE 1 270 | ON/OFF VALVE 2 300 | SOLENOID 1 180 | SOLENOID 2 220 | FORWARD CLUTCH 36 | REVERSE HIGH CLUTCH 38 | INTERMEDIATE SERVO 54 APPLY 62 | INTERMEDIATE SERVO 54 RELEASE 60 | LOW REVERSE SERVO 84 |
|---|---|---|---|---|---|---|---|---|---|---|
| P | NEUTRAL | O | O | X/O | X/O | O | O | O | O | O |
| R | REVERSE | X | O | X/O | X/O | O | X | O | X | X |
| N | NEUTRAL | O | O | X/O | X/O | O | O | O | O | O |
| D | LOW | O | X | X | X | X | O | O | O | O |
| D | INTERMEDIATE | O | X | O | X | X | O | X | O | O |
| D | DIRECT | O | X | O | O | X | X | X | X | O |
| 2 | INTERMEDIATE | O | O | X/O | X/O | X | O | X | O | O |
| 2 | LOW | X | X | O | O | X | O | O | O | X |
| 1 | INTERMEDIATE | O | X | O | X | X | O | X | O | O |

X = ON    O = OFF    X/O - ON OR OFF

ELECTRONIC AND HYDRAULIC CONTROL SYSTEM FOR AUTOMATIC GEAR CHANGE TRANSMISSION

BACKGROUND OF THE INVENTION

1. Field of the Invention

This invention relates generally to a hydraulic control system for an automatic gear change transmission. More particularly, the invention pertains to such a control system whose operation is controlled by an electronic control system which produces signals that cause selective pressurization of the gear change elements of the transmission.

2. Description of the Prior Art

Automatic transmissions for automotive use include planetary gearing in which the various gear elements are hydraulically braked in order to produce selected speed ratio ranged between the engine and drive wheels. Speed ratio changes result upon braking of a selected portion of the planetary gear drive.

Increasingly, automatic gear change transmissions are controlled by electronic means. Electronic control units operate reliably but it is possible that a cable may break or that the entire electronic control unit may fail. It is important, in the event of an electronic failure, that the various speed ratios of the transmission should be available to the operator in order to permit driving the vehicle to a service station for repair. It is known in the prior art that at least the first gear and the reverse gear of a transmission can operate in the event of an electronic system failure. U.S. Pat. No. 3,937,108 describes a system providing this function. U.S. Pat. No. 3,813,964 describes a control system wherein a valve prevents upshifting from the low speed range when the electronic control system fails and the transmission is set in the first speed ratio. It is preferable, however, that all the forward speed ratios and the reverse drive should be available to the vehicle operator if the electronic control system should fail. In this way, damage to the transmission can be avoided and the vehicle more easily driven to the service station.

SUMMARY OF THE INVENTION

The control unit of an electronic microprocessor will produce signals that operate to shift valves in the hydraulic control system of an automatic transmission. Generally, the electronic control systems operate such that if electric power is lost, the electronic control defaults to an OFF condition in which no control current is applied to operate the valves that are a part of hydraulic control system. When correctly operating, the electronic control produces an electronic signal for operating the hydraulic valves in response to the reading of the engine speed or the vehicle speed.

The first object of having all forward speed ratios and the reverse drive available to the vehicle operator in the event of an electronic failure is realized by allowing the hydraulic control system to pressurize the necessary elements of the transmission when a vehicle operator changes the position of a manual valve. The hydraulic control circuitry allows all of the gears of the transmission to be available when the electrically operated solenoid valves are in the OFF condition. The ON/OFF valves operating in combination with the manual valve permit manual control independently of the operation of the electrical control.

Another object of our invention is to provide a control system wherein line pressure regulation can occur either when a variable force solenoid is controlled by the control unit of a microprocessor or when the electronic signal to the solenoid is lost. This result occurs by biasing the line pressure regulator valve with a mechanical spring that produces a force in the direction of a force produced by the variable force solenoid. In this way if the electronic control signal is lost, the spring will modulate line pressure and produce a regulated line pressure determined by the force of the spring. The control system according to our invention includes a variable force solenoid for controlling the position of a line pressure regulator valve in response to an electronic signal from the microprocessor. First and second solenoids controls respectively the position of two solenoid valves which act as shift valves to produce the various speed ratios of the transmission.

First and second ON/OFF valves whose state is determined hydraulically act as pressure distributors that permit the manual valve to overrule the operation of the electronically controlled solenoid valves if there is an electronic malfunction. A manual valve is moveable between the usual park, reverse, neutral, drive 2 and 1 positions. The manual valve operates in the usual manner during normal operation to allow automatic shifting to the selected gear setting. However, the manual valve can be adjusted by the vehicle operator in the event of an electrical failure to produce shifting among the gear ratios of the transmission by adjusting the setting of the manual valve between any of the gear ratios available in the transmission.

Two hydraulically operated servos control friction brakes in the transmission and two clutches connect torque delivery elements in the transmission. The servos and the clutches are pressurized selectively in normal operation according to the electrical signals received from the microprocessor control unit. Alternatively, in the event of an electronic failure, the servos are pressurized according to the control exercised over the hydraulic circuitry by the vehicle operator upon setting the manual valve to any of the forward or reverse speed ratios.

BRIEF DESCRIPTION OF THE DRAWINGS

FIG. 3 is a schedule of the ON and OFF status of the solenoids and ON-OFF valves that pressurize the various gear system components according to the setting of the manual valve and the operating mode of the transmission.

DESCRIPTION OF THE PREFERRED EMBODIMENT

Figure 1:
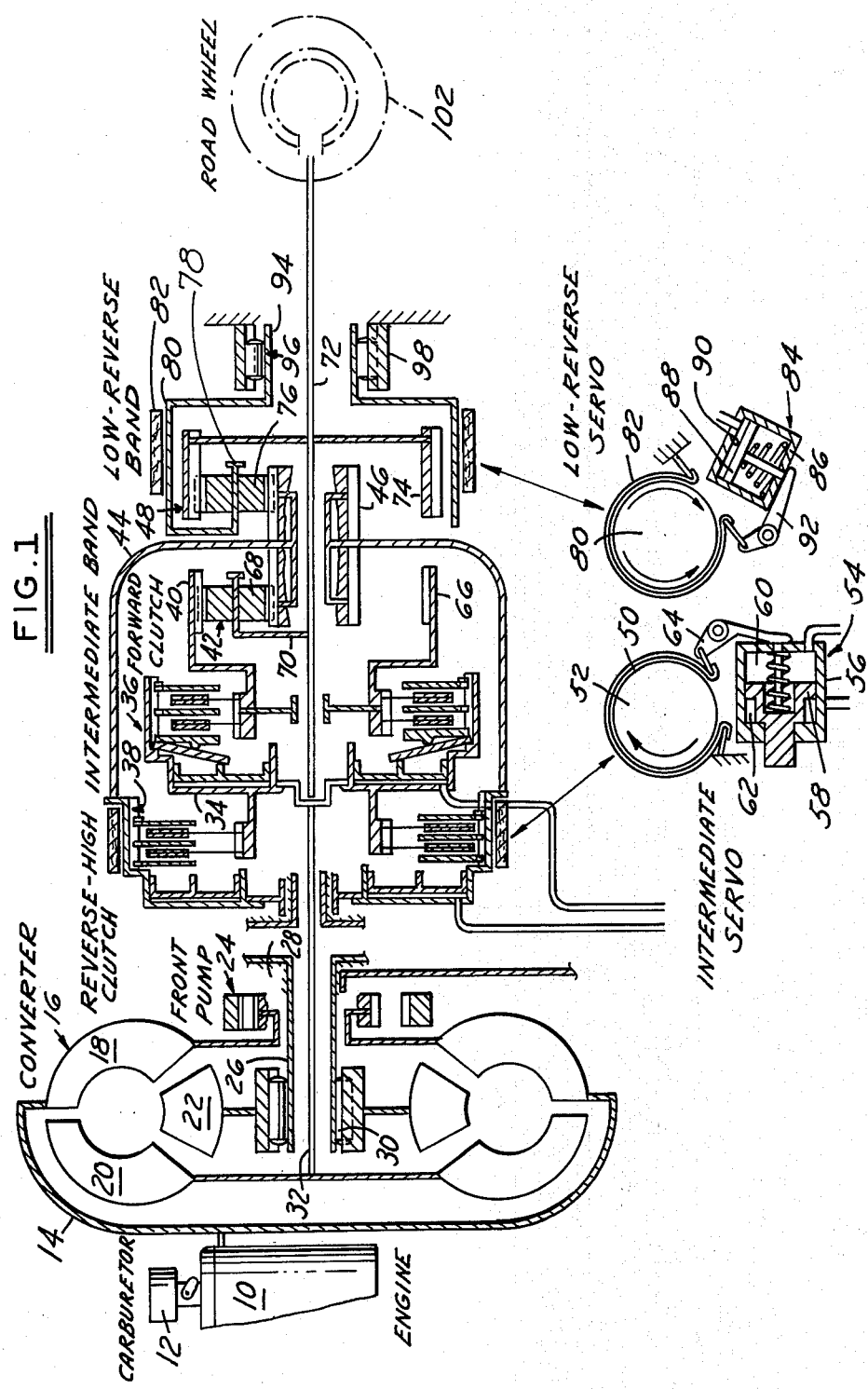
FIG. 1 shows in schematic form the torque transmitting gear system for use with the control system of our invention.

Referring first to FIG. 1, an internal combustion engine 10 in an automotive vehicle driveline includes a carburetor 12 which forms a part of the air fuel mixture intake manifold system. The engine crankshaft is driveably connected to the impeller drive shell 14 of a hydrokinetic torque converter unit 16. This unit includes a bladed impeller 18, a bladed turbine 20, and a bladed stator 22. The impeller, turbine and stator are disposed in the conventional torodial fluid flow relationship. A positive displacement pump 24 is driveably connected to the impeller 18.

An overrunning brake 30 for the stator 22 includes overrunning coupling elements between a shaft 26 and the stator 22 which permit free wheeling motion of the stator in the direction of rotation of the impeller, but rotation of the stator in the opposite direction is prevented.

The turbine 20 is connected driveably to a central turbine shaft 32. Shaft 32 is connected directly to a clutch element 34 which is common to a forward drive friction disc clutch 36 and to a reverse friction disc clutch 38. Clutch 36, which is actuated by means of a fluid pressure operated servo, functions to connect selectively the clutch element 34 to the ring 40 of a simple planetary gear unit 42. Clutch 38 is actuated by a fluid pressure operated servo as indicated. It functions to driveably connect element 34 to a drive shell 44 when it is engaged. The shell 44 is connected to a common sun gear 46 of the planetary gear unit 42 and to a second simple planetary gear unit 48.

An intermediate speed ratio friction brake band 50 surrounds the clutch drum 52 of the reverse and direct clutch 38. Drum 52 is connected to the drive shell 44. The brake band 50 is applied and released by means of a front intermediate brake servo 54, which includes a cylinder 56 and a cooperating piston 58. Cylinder 56 and piston 58 cooperate to define a brake release chamber 60 and a brake apply chamber 62. The piston 58 is connected to the brake band 50 by the linkage 64.

Planetary gear unit 42 includes a ring gear 66, planet pinions 68 and a carrier 70 on which the pinions 68 are journalled. Pinions 68 mesh with the ring gear 66 and with the sun gear 46. Carrier 70 is connected driveably to a power output shaft 72.

Planetary gear unit 48 includes a ring gear 74, planet pinions 76 and a carrier 78 on which the pinions 76 are journalled. Ring gear 74 and sun gear 46 are in mesh with the pinions 76. Power output shaft 72 is connected driveably to the ring gear 74.

Carrier 78 is connected to a brake drum 80, which has a reverse and low brake band 82 positioned adjacent its outer periphery. The brake band may be applied during reverse drive operation and during operation in the manual low drive range by means of fluid pressure applied to reverse-low servo 84. This servo includes a cylinder 86 and a piston 88, which cooperate to define a fluid pressure chamber 90. This chamber has pressurized fluid applied by means of the circuits illustrated in FIGS. 2 and 3.

The piston 88 is connected to the free end of the brake band 82 by the linkage 92. Brake drum 80 is connected to the inner race 94 of an overrunning reaction brake 96. The outer race of the brake 96 is connected to a portion of the transmission housing shown in 98. Brake 96 includes overrunning brake elements that anchor the carrier 78 against rotation in one direction to accommodate reaction torque, but allow freewheeling motion in the opposite direction. The brake 96 is effective during operation in the lowest speed ratio to accommodate driving torque reaction.

To condition the mechanism for operation at the lowest speed ratio in the drive range, it is necessary to apply the forward clutch 36. This clutch remains applied during operation in each forward drive speed ratio. In this condition, torque is delivered from a turbine 20 through the clutch 36 to the ring gear 40. Since the carrier 70 is connected to the power output shaft 72 and since it resists movement, sun gear 46 tends to be driven in a reverse direction. A positive driving torque, which is transmitted directly to the shaft 72 however, is applied to the carrier 70. The reverse motion of the sun gear 46 causes ring gear 74 to be driven in a forward drive direction because the carrier 78 acts as a reaction member. Carrier 78 is inhibited from rotation in the direction of rotation of the sun gear 46 by the overrunning brake 96, which acts as a reaction point for the gear system. The positive driving torque transmitted to the ring gear 74 is transmitted directly to the power output shaft 72. Therefore, a split torque delivery path is provided through the gearing during low speed ratio operation.

For intermediate underdrive operation in the drive range, the intermediate speed ratio brake band 50 is applied by pressurizing chamber 62 of the brake servo 54 and the clutch 36 is engaged. This action anchors the sun gear 46 so that it can function as a reaction member. Turbine torque is carried by the shaft 32 through the clutch 36 to the ring gear 40. Sun gear 46 accommodates reaction torque as the carrier 70 is driven in a forward driving direction. This drives the output shaft 72 at an increased speed ratio as the overrunning brake 95 overruns. Therefore a transition from the lowest speed ratio to the intermediate speed ratio in the drive range is accomplished by engaging only one friction torque establishing device, the brake band 50.

To establish a high speed ratio condition in the drive range, brake band 50 is released concurrently with the application of the reverse-high clutch 38. Friction clutch 36 remains applied. Thus the sun gear 46 becomes locked to the ring gear 40 and the elements of the gearing rotate in unison to establish a 1:1 speed ratio.

Continous operation at the low speed ratio of the 1 operating range results by engaging the brake band 82, which is accomplished by pressurizing the chamber 90 of the reverse-low servo 84. This anchors the carrier 78. The forward clutch 36 remains applied, as it is in all forward speed conditions. Turbine torque is carried, as previously described, to the ring gear 40 as a split torque delivery path is established in the gearing. The control system is conditioned so that upshifts to the higher speed ratios will be inhibited.

Continous operation at the intermediate speed ratio of the 1 operating range results upon application of the forward clutch 36 and the intermediate servo 54 upon pressurizing the apply chamber 62, as was previously described with respect to the intermediate speed ratio in the drive range. Continous intermediate speed ratio operation in the 2 range results from a similar application of the forward clutch 36 and the intermediate servo 54 upon pressurizing the apply cylinder 62.

Reverse drive operation is obtained by releasing the forward friction clutch 36 and applying the reverse-high clutch 38. Brake band 82 is applied by pressurizing the chamber 90 of the low-reverse servo 84 and the intermediate band 50 is released. Turbine torque is then distributed directly to the drive shell 44 through the reverse-high clutch 38. This drives the sun ear 46 in the direction of rotation of the turbine. Since carrier 78 is anchored, ring gear 48 and the output shaft 72 are driven in a reverse direction at a reduced speed ration.

During an upshift from a lower speed ratio to the intermediate speed ratio, fluid pressure is admitted to the brake servo chamber 62. Upon a subsequent upshift from the intermediate speed ratio to the high speed ratio, pressure is distributed simultaneously to chambers 62 and 60 of the intermediate servo 54 to relese the brake 50. Upon a subsequent downshift from the high speed ratio to the intermediate speed ratio, it is necessary to exhaust chamber 60 as the clutch 38 is released. The residual pressure in chamber 62 applies the servo 54.

Figure 2:
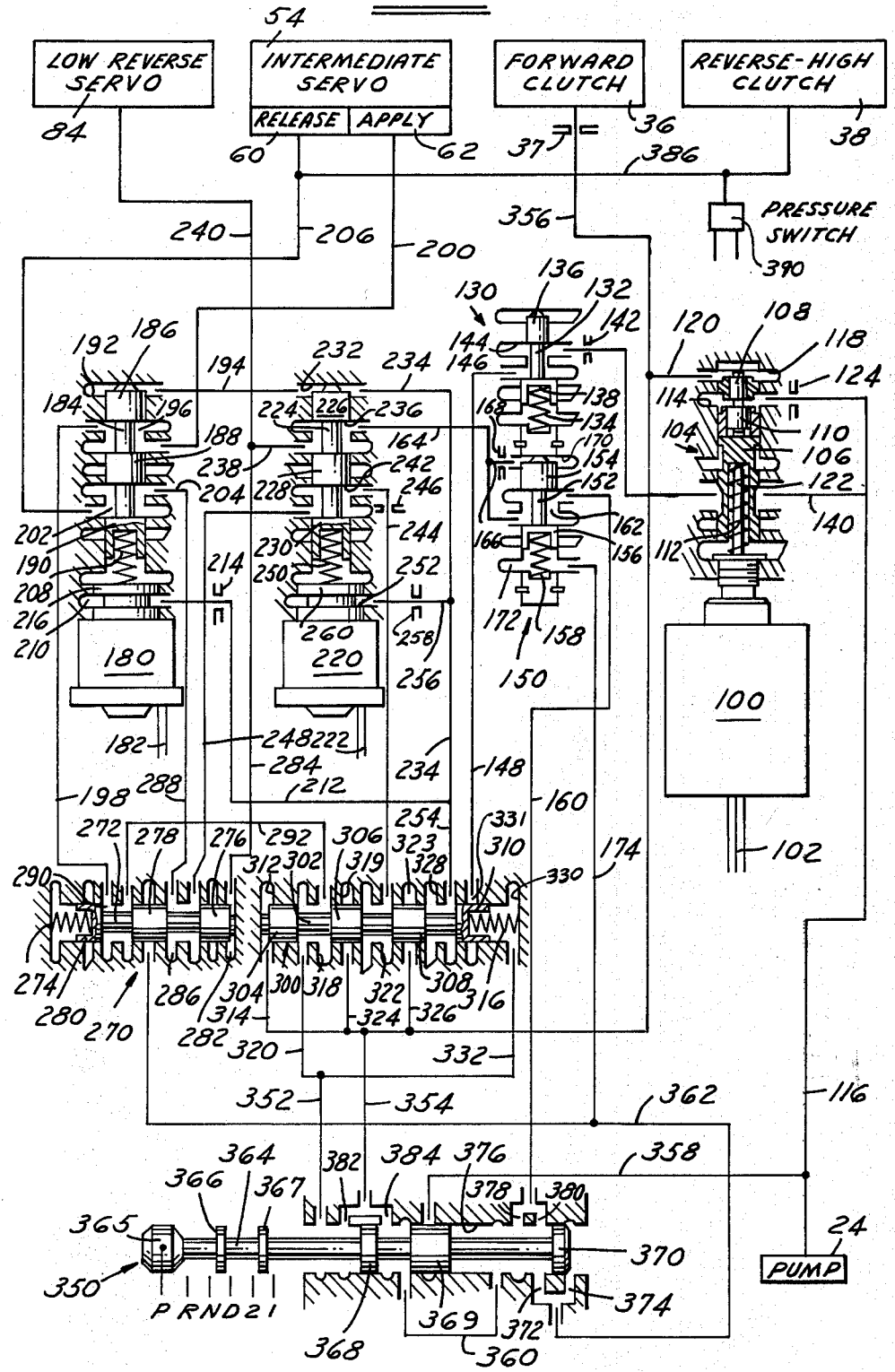
FIG. 2 is a schematic diagram of the hydraulic circuit for controlling the gear system of FIG. 1 showing the several solenoids controlled by the control unit of a microprocessor.

The control system for obtaining automatic speed ratio changes in the torque transmitting structure of FIG. 1 is illustrated in FIG. 2. The pressure regulator solenoid 100 is connected by the electrical line 102 to the output port of an electronic microprocessor which supplies electrical current to the solenoid 100 in proportion to engine load. Look-up tables stored in RAM computer memory have a preferred schedule of the output current-engine load relationship for a particular engine-transmission combination. Actually any desired parameter, such as torque, engine speed, road speed, etc., could be the dependent variable from which the current magnitude can be determined from the tables or by calculation.

Solenoid 100 is a variable force solenoid which applies a force to the line pressure regulator valve that varies as the input current varies. The line pressure regulator valve 104 includes a multiple land valve spool 106 which has lands 108, 110 formed thereon. The valve spool 106 is slideably mounted within a valve chamber and is biased in one direction within the chamber by spring 112. Lands 108 and 110 are formed with different diameters and define an annular space between them at chamber 114, which communicates with the discharge side of the pump 24 by way of the passage 116. At one axial end of the valve spool 106, the chamber 118 is formed, which allows fluid pressure to be applied to the opposite face of the land 108 by way of the fluid passage 120.

The variable force solenoid 100 has an axially extending pin member 122 which contacts the valve spool 106. When the solenoid is activated, a force is applied to the spool 106 which varies with the amount of current supplied to the solenoid. The force applied to the valve spool by the solenoid acts in axial opposition to the net hydraulic force developed on the differential areas on the land 108 and 110. The effect of the solenoid 100 is to move the valve spool outwardly whereas the hydraulic force moves the valve spool toward the solenoid 100. An orifice 124 is formed within passage 116 and produces a pressure drop between the discharge side of the pump and the line pressure regulator valve 104.

A solenoid pressure regulator valve 130 has a valve spool 132 biased by a spring 134 in one direction within the valve chamber. The spool 132 has lands 136, 138 formed thereon. A hydraulic passage 140 communicating directly with the discharge side of the pump carries hydraulic fluid through the orifice 142 into the chamber 144. Chamber 146 communicates with chamber 144 when the valve spool 132 is positioned as shown in FIG. 2. Fluid passage 148 carries hydraulic fluid from a chamber 146 to the second ON/OFF valve 300. The pressure transmitted in the passage 148 differs from the pressure of passage 140 to the extent that the orifice produces a pressure drop. The spring 134 acts to bias the solenoid pressure regulator valve 130 to the open position where chambers 144 and 146 are in communication.

At the opposite end of valve 130 is a pressure modulator valve 150. A modulator valve spool 152 is positioned intermediate lands 154, 156 and the spool 152 is similarly biased by the mechanical spring 158. The fluid passage 160 communicates chamber 162 with a manual valve 350. Fluid line 164 connects the outlet side of chamber 162 with the second solenoid valve 224. The passage 166 communicates with the line 164 and carries hydraulic fluid through an orifice 168 into the chamber 170 behind the land 154. Chamber 172 is supplied with hydraulic fluid by the passage 174 which communicates the passage 172 with the manual valve 350.

A first solenoid 180 is connected by the electrical line 182 to the output port of a microprocessor. When solenoid 180 is ON and chamber 192 is pressurized, solenoid valve spool 184 is caused to move axially downwardly within the valve bore. This occurs because in the ON state solenoid 180 opens chamber 210 thereby causing the pressure force on the end face of land 186 to exceed the force of spring 208. In the OFF state, chamber 210 can be pressurized through passage 212. The spool is formed with lands 186, 188, 190, which have equal cross-sectional areas in registry with corresponding lands formed in the valve bore. Chamber 192 communicates via passage 194 with the corresponding chamber in solenoid valve 224. Chamber 196 is supplied with hydraulic fluid from the first ON/OFF valve 270 by passage 198. The outlet side of chamber 196 communicates with the apply chamber 62 of the intermediate servo 54 by way of the fluid passage 200. A third chamber 202 communicates with the first ON/OFF valve 270 by way of hydraulic line 204 and the outlet end of chamber 202 communicates with the brake release chamber 60 of the intermediate servo 54 by the hydraulic line 206. The spring 208 acts is axial opposition to the force applied to the valve spool 184 when the solenoid 180 is ON. A fourth chamber 210 has solenoid valve pressure applied through the hydraulic line 212 after passing through the orifice 214. The pressure area of land 216 is greater than that of lands 186, 188, 190; therefore, when chamber 210 is pressurized and solenoid 180 if OFF, the valve spool 184 is positioned as shown in FIG. 2.

A second solenoid 220 is connected by an electrical line 222 to the output port of a microprocessor. When solenoid 220 is ON and chamber 232 is pressurized, valve spool 224 slides axially downwardly within the valve bore. This occurs because in the ON state solenoid 220 depressurizes chamber 252 thereby causing the pressure force on the end face of land 226 to exceed the force of spring 250. In the OFF state, chamber 252 can be pressurized through passage 256.

Spool 224 has three equally sized lands 226, 228, 230 formed thereon which are in registry with lands formed in the valve bore. A first chamber 232 is in communication with an end chamber 192 of the first solenoid valve via line 194. Chamber 232 is supplied by a passage 234 communicating with the second ON/OFF valve 300. A second chamber 236 is pressurized by the hydraulic line 164 communicating with the pressure modulator 150. The outlet side of the chamber 236 communicates with the low-reverse servo 84 by way of the passages 238, 240. A third chamber 242 is supplied with hydraulic fluid by the line 244 which directs the fluid through an orifice 246 before its admittance to the chamber 242. The outlet side of the chamber 242 is in communication with the first ON/OFF valve by the passage 248. A spring 250 biases the valve spool 224 into the position shown in FIG. 2 where the valve spool is at rest at the top of chamber 232. A fourth chamber 252 is supplied with hydraulic fluid from the second ON/OFF valve by the passages 254, 234, and 256, which direct the fluid through an orifice 258 before entering the chamber 252. A fourth land 260 has a larger diameter than the lands 226, 228, 230 so that when chamber 252 receives solenoid valve pressure, spool 224 is biased by the spring 250 and the presure force acting on the land 260 toward the position shown in FIG. 2.

Solenoids 180 and 220 are energized by way of the microprocessor control according to programmed logic within the microprocessor to control automatic shifting among the several forward speed ratios. Information concerning various engine parameters and operating variables is received by the microprocessor from sensors such as transducers. The control produces a signal that switches the solenoid to the ON state; lack of a signal produces the OFF state. In case of loss of electronic control, the system default produces the OFF state in the solenoids.

A first ON/OFF valve 270 has a valve spool 272 slideable within a valve bore and biased by a spring 274 into the position shown in FIG. 2. The spool has three lands 276, 278, 280, which are in registry with corresponding lands formed in the valve bore. A first chamber 282 is supplied with hydraulic fluid from the second solenoid valve by way of passages 238, 284. When chamber 282 is pressurized, the hydraulic pressure produces a force on the land 276 acting in opposition to the spring biasing force. When this pressure force exceeds the spring force, the valve spool 272 is moved toward the left-hand end of the valve bore. This movement has the effect of opening and closing selectively the various passages of the ON/OFF valve 270. A second chamber 286 is in communication with the second solenoid valve by way of the passage 248 and with the first solenoid valve by way of the passage 288. Axial shifting movement of the ON/OFF valve spool 272 will selectively open and close communication between passages 288 and 248 depending on the position of the land 276. A third chamber 290 is supplied with hydraulic fluid from the second ON/OFF valve 300 through the passage 292. Depending upon the position of the lands 278, 280, the passage 198 will communicate chamber 290 with chamber 196 of the first solenoid valve.

The second ON/OFF valve 300 has a valve spool 302 slideably moveable within the valve chamber. The spool has four equal diameter lands 304, 306, 308, 310, which are in registry with lands formed in the valve bore. A first chamber 312 located at one end of the valve bore is supplied with hydraulic fluid from the pump 24 by way of the manual valve 350 through the hydraulic passages 314, 354. The valve spool 302 is biased by a spring 316, which acts in opposition to the pressure force developed on the outer pressure area of the land 304 when the chamber 312 is pressurized. When chamber 312 is pressurized the valve spool 302 is shifted in the right-hand direction against the force of the spring. The ON/OFF valve 300 has a second chamber 318, which is pressurized from the pump 24 by way of the manual valve 350 and the passages 320, 352. Passage 292 communicates chamber 318 with chamber 290 of ON/OFF valve 270. A third chamber 322 communicates with chamber 242 of the second solenoid valve by way of the passage 244. Axial shifting movement of spool 302 will selectively connect the discharge side of the pump by way of the manual valve to the chamber 322. The lands on the valve bore in registry with lands 306, 308 are supplied with hydraulic fluid from the manual valve by the passages 324, 326, respectively.

A fourth chamber 328 is pressurized with solenoid valve pressure by way of the passage 148 when the valve spool 302 is moved in the right-hand direction upon chamber 312 being pressurized. When this shifting motion occurs, solenoid valve pressure is transmitted axially in the bore of the valve 300 and applies pressure to chambers 232 and 192 at the axial ends of the first and second solenoid valves. A fifth chamber 330 communicates via passage 332 with the manual valve 350. When chamber 330 is pressurized, the pressure force acting on the inner end of the land 310 cooperates with the spring force to cause the valve spool 302 to move in the left-hand direction to the position shown in FIG. 2.

The manual valve 350 has one exit passage 352, which communicates with passages 320 and 332 for input to the second ON/OFF valve 300, and a second exit passage 354 which communicates with passage 314, 324, 326 to the several chambers of the second ON/OFF valve 300. Exit passage 354 directs hydraulic fluid through passage 356 to the forward clutch 36 after passing through an intermediate orifice 37. An inlet passage 358 communicates the manual valve 350 with the discharge side of the pump 24. A crossover passage 360 carries hydraulic fluid between internal chambers of the valve 350. An outlet passage 362 carries hydraulic fluid from the manual valve 352 to the valve bore of the first ON/OFF valve 270.

The manual valve includes a spool 364 whose axial position within the valve bore is determined by the setting of the gear shift selector by the vehicle operator. The shift selector allows the manual valve spool to be located at any of six axial settings marked P,R,N,D,2 and 1. These settings correspond respectively to the drive ranges at which the vehicle operator may set the transmission, namely park, reverse, neutral, drive and two low-speed ratios also available within the drive range. The manual valve spool 364 has five equal size lands 366, 367, 368, 369, 370 formed integrally therewith. The lands are in registry with the valve bore and operate selectively to open and close passages from the manual valve to the rest of the hydraulic control system. The valve spool is shown in FIG. 2 in the park condition.

Internal chambers 372 and 374 communicate the valve bore 376 with the outlet passage 362. Similarly, internal passages 378, 380 communicate the valve bore 376 with the passage 160 that carries hydraulic fluid to the pressure modulator 150. Internal passages 382, 384 communicate the exit passage 354 with the valve bore 376.

In operation, the low-reverse servo 84, the intermediate servo 54, the forward clutch 36 and the reverse-high clutch 38 are selectively supplied with pressurized hydraulic fluid in order for the gear arrangement of FIG. 1 to function in the operating mode selected by the vehicle operator by way of his control over the gear selector which directly controls the manual valve setting. The operation of the hydraulic control circuit shown in FIG. 2 will be described with respect to pressurizing the servos 54, 84 and the clutches 36 and 38 that are required to produce nine operating modes of the transmission, presented in FIG. 3. These modes can be derived from the six manual valve settings.

To condition the transmission for a neutral operation, the manual valve is set to either the park or neutral positions. When the manual valve is set at P, land 369 blocks supply passage 358, which otherwise would connect the discharge side of the pump 24 with the manual valve. When the manual valve is set at N, passage 358 communicates the pump 254 with the valve bore 376, but the lands 368 and 369 seal the valve bore and effectively close off communication of the pump with the control circuit by way of the manual valve. When the selector is set at P or N, line pressure is carried in passages 116 through the orifice 124 to the chamber 114 of the line pressure regulator valve 104. However, due to the force of the solenoid 100, the spool 106 of the regulator valve 104 is at the axial end of the valve bore; therefore chamber 114 is closed. Line pressure is supplied by passage 140 through the orifice 142 to the solenoid pressure regulator valve chamber 144. Solenoid valve pressure is applied by passage 148 to ON/OFF valve 300, but because valve 300 is OFF, as indicated by the schedule of FIG. 3, passage 148 is closed. Consequently, neither servo 54 or 84 nor clutches 36, 38 are pressurized when the manual valve is set at P or N. Line pressure was reduced, however, by way of the orifice 142 and solenoid valve pressure was reduced accordingly to a lesser value than line pressure.

When the manual valve is set for the R range, the transmission is disposed for reverse operation. When the reverse-high clutch 38, the low-reverse servo 84 and the release chamber 60 of the intermediate servo 54 are pressurized the hydraulic control system will pressurize passages 206, 240 and 386 by the procedure next to be described. According to the schedule of FIG. 3, the first ON/OFF valve 270 is in the ON position for reverse operation, which locates the valve spool 272 within the valve bore at the left-hand end. The first and second solenoids 180, 220 can be either in the ON or OFF condition. Whether solenoids 180 and 220 are ON or OFF, valve spools 184 and 224 move to the top of their valve bores as shown in FIG. 2. The electrical signal for actuating the solenoids to the ON condition would, of course, be supplied from output port of the microprocessor.

The discharge side of the pump 24 communicates with the bore 376 of the manual valve 350 and flow passes through the crossover passage 360 to the opposite side of land 369. Discharge pressure passes through the bore 376 through the internal chamber 372 and into the passage 362 through which it is carried to the first ON/OFF valve 270. However, this valve is ON and the valve spool 272, in moving toward the left, causes the land 278 to allow discharge fluid to enter chamber 286 and to exit the ON/OFF valve 270 by way of the passage 288, through which it is directed to the first solenoid valve. Land 276 prevents flow from chamber 386 into the passage 248.

With the first solenoid 180 positioned as shown in FIG. 2, chamber 202 of the first solenoid valve is pressurized by passage 204 and is exhausted through passage 206, which directly flows to the release chamber 60 of the intermediate servo 54.

The discharge side of the pump 24 is connected by passage 116 through the orifice 124 to chamber 114. The variable force solenoid 100 is always ON, absent an electrical failure. Since chamber 118 is not pressurized, the line pressure regulator valve 104 is positioned as shown in FIG. 2. This position causes chamber 114 to be closed off. Passage 140 carries fluid from the pump 24 through the orifice 122 and into chamber 144 of the solenoid pressure regulator valve 130. Hydraulic fluid at a reduced regulator valve pressure exits chamber 144 through the passage 148 through which it is carried to the second ON/OFF valve 300. This valve is in the OFF state; therefore, land 310 blocks the passage 148 and solenoid pressure is not applied to the hydraulic circuit. The pressure modulator valve 150 is, however, pressurized from the discharge side of the pump by way of the manual valve 350 through the passage 174 which directs flow into chamber 162. Similarly, passage 160 is pressurized by way of the internal passages 378 and 380 of the manual valve 350. Passage 160 directs flow into chamber 162. Flow from chamber 162 is carried in passage 164 to the chamber 236 of the second solenoid valve, which for purposes of this discussion is in the OFF state. Therefore, flow leaves chamber 236 through the passage 238 and is carried by passage 240 to the low-reverse servo 84. Passage 238, in addition to providing flow to 240, also directs flow to passage 284 and to chamber 282 of the first ON/OFF valve 270. The effect of pressurizing chamber 282 is to place valve 270 in the ON condition which, as previously described, causes the release chamber 60 to be pressurized. Similarly, the reverse-high clutch 38 is pressurized through passage 386, which intersects with passage 206.

In order to condition the gear arrangement for automatic shifting among the three forward speed ratios, the manual valve 350 is set in the D condition. To produce the lowest speed ratio drive condition, operation of the hydraulic control circuitry is directed to pressurizing the forward clutch 36. The first ON/OFF valve 270 is OFF and the second ON/OFF valve 300 is ON. The first and second solenoids 180, 220 are switched ON by the control unit of the microprocessor. The forward speed ratio drive operation will result when only the forward clutch 36 is pressurized.

When the manual valve 350 is at the D setting, land 368 has moved to the right side of the inlet passage 358, which communicates the discharge side of the pump 24 with the valve bore 376. Fluid flows in the valve bore through the internal passages 382, 384 and exits the manual valve through exit passage 354. Passage 352 is closed OFF by the land 367. The second ON/OFF valve 300 is switched to the ON position when chamber 312 is pressurized through passage 314. Valve spool 302 is moved to the right-hand end of the valve bore which opens communication between chambers 319 and 318. Passage 292, therefore communicates chamber 318 with chamber 290 of the first ON/OFF valve 270, which is OFF. Passage 198 communicates chamber 290 with chamber 196 of the first solenoid valve. However, solenoid 108 is ON; consequently, spool 184 is moved downwardly toward the solenoid 180 causing land 186 to close chamber 196. Chamber 323 of the second ON/OFF valve 300 is pressurized through the passage 326. Since valve 300 is ON, chambers 322 and 323 are in communication and passage 244 communicates ON/OFF valve 300 with chamber 242 of the second solenoid valve through the orifice 246. However, in the low speed ratio drive condition, the second solenoid 220 is ON; therefore land 228 is moved downwardly to close the chamber 242. Passage 358 communicates the discharge side of the pump 24 with the exit passage 354 of the manual valve 350.

Passage 140 connects the discharge side of pump 24 with chamber 144 of solenoid pressure valve 130 through the orifice 142. Consequently, hydraulic fluid at a reduced solenoid pressure exits chamber 144 through the passage 148, which carries it to chamber 331 of the second ON/OFF valve 300. With this valve in the ON condition, solenoid valve pressure exits chamber 328 through passage 254, which distributes the flow through passage 212 and orifice 214 to chamber 210 of the first solenoid valve. Because solenoid 180 is ON, chamber 210 is depressurized and the pressure force on the end of land 186 overcomes the force of spring 208. A second path from ON/OFF valve 300 carries fluid at solenoid valve pressure through passage 234 to chamber 232 and through passage 194 into chamber 192. A pressure force is developed on the spools 184, 224 in opposition to the force of the springs 208, 250.

With the manual valve 350 in the D range the transmission is disposed for intermediate speed ratio operation by pressurizing the forward clutch 36 and the apply chamber 62 of the intermediate servo 54. The hydraulic control circuit operates to produce this effect by first communicating the discharge side of pump 24 with the manual valve 350, which directs flow into passage 354. Intermediate speed ratio is produced when the second ON/OFF valve 300 is ON, the first solenoid 180 is OFF and the second solenoid 220 is ON.

When chamber 312 is pressurized through the passage 314, spool 302 is moved in the right-hand direction in the opposition to the force of the spring 316. Consequently, passage 324 is brought into communication with passage 292 when the chamber 319 is cleared by land 306. Passage 292 opens flow to chamber 290 of the first ON/OFF valve 270, which is in the OFF position shown in FIG. 2. Accordingly, passage 198 carries hydraulic fluid from chamber 290 to chamber 196 of the first solenoid valve. Solenoid 180 is OFF; hence flow is open to passage 200 and flow proceeds to the apply chamber 62 of the intermediate servo 54. The third passage 326 exiting the manual valve 350 carries the hydraulic fluid into chamber 323, which in this condition is in communication with chamber 322 since the land 308 is cleared. Flow then proceeds in passage 244 into chamber 242 of the second solenoid valve. In this case, solenoid 220 is ON and spool 224 moving downwardly causes land 228 to move into registry with chamber 242 and to close that chamber against further flow.

The fourth passage 356 exiting the manual valve carries hydraulic fluid at pump discharge pressure directly to the forward clutch 36 through the orifice 37. In addition, passage 120 carries hydraulic fluid into chamber 118 of the line pressure regulator valve 104. Passage 116 also directs flow from the discharge side of pump 24 into chamber 114 after passing through the orifice 124. Passages 116 and 140 communicate the pump 24 with the chamber 144 of the solenoid pressure regulator valve 130 by way of orifice 142. Fluid at a reduced solenoid pressure flows from the chamber 144 in passage 148 to the second ON/OFF valve 300 which, in the ON condition, permits flow to proceed through passage 254, 232, 194 into chamber 234 and 192 of the second and first solenoid valves, respectively. Passage 212 intersecting with passage 254 directs flow through the orifice 214 and into chamber 210 of the first solenoid valve. However, since the solenoid 180 is OFF, solenoid valve pressure flow is closed off by the land 216.

The gear arrangement is disposed for direct speed ratio drive when the manual valve is placed in the D condition. In this condition it is necessary that the reverse-high clutch 38, the forward clutch 36, and the apply chamber 62 and release chamber 60 of the intermediate servo 54 be pressurized. As FIG. 3 indicates, in this condition the second ON/OFF valve 300 is ON. The first ON/OFF valve 270 is OFF and both the first and second solenoids 180, 220 are OFF.

Again, the manual valve 350, when placed in the D condition, directs flow from the discharge side of pump 24 through passage 354 and through passages 314, 324, 326, 356. Passage 314 again pressurizes chamber 312 of the second ON/OFF valve 300 causing the valve spool 302 to compress the spring 316 when it moves in the right-hand direction. This sliding action opens communication between passage 324 and 292 and flow proceeds into chamber 290 of the first ON/OFF valve 270. Flow exits chamber 290 through passages 198, which communicates with chamber 196 of the first solenoid valve. Since solenoid 180 is OFF, spool 184 moves upward and communication is possible within chamber 196 between passage 198 and passage 200, which communicates directly with the apply chamber 62.

A third passage 326 connecting with passage 354 exits the manual valve and carries flow into chamber 323 of the second ON/OFF valve 300. Because land 308 has moved to the right, the net pressure forces on lands 228 and 260 add to the force of spring 250 whereby flow proceeds in passage 244 through orifice 246 and into chamber 242 of the second solenoid valve. Because solenoid 220 is OFF, communication between passages 244 and 248 is possible through the chamber 242. Passage 248 directs flow into chamber 286 of the first ON/OFF valve 270. Flow is unobstructed within the valve and exits the valve through passage 288 and 204, which communicate with chamber 202 of the first solenoid valve. Solenoid 180 is OFF, therefore, chamber 202 permits flow to exit the valve through passage 206 which communicates directly with the release chamber 60 of the intermediate servo 54. Passage 386 intersects with passage 206 and pressurizes the reverse-high clutch 38.

Passage 356 is supplied by passage 354 on the exit side of the manual valve and communicates the discharge side of pump 24 with the forward clutch 36 after passing through the orifice 37.

Passage 120 intersects with passage 356 and pressurizes chamber 118 of the line pressure regulator valve 104. This produces a pressure force on the face of land 108, which force acts in opposition to the force of the variable force solenoid 100. As has previously been described with respect to the other D-range conditions, passage 140 communicates the discharge side of pump 24 with chamber 144 of the solenoid pressure regulator valve 130. A pressure drop occurs across the orifice 142 and a reduced pressure flow exits chamber 144 through passage 148, which communicates with chamber 330 of the second ON/OFF valve 300. Because valve 300 is ON, flow exits valve 300 through passage 254, which communicates through passage 212 with chamber 210 of the first solenoid valve. Similarly, chamber 252 of the second solenoid valve is pressurized through the line 256. Because solenoids 180 and 220 are OFF, chambers 210 and 252 are closed by the lands 216 and 260, respectively.

The transmission will operate at intermediate speed ratio when the manual valve 350 is placed in the 2 range. In this case, the forward clutch 36 and the apply chamber 62 of the intermediate servo 54 are pressurized. The first and second ON/OFF valves 270, 300 are OFF and the first and second solenoids 180, 220 may be either ON or OFF.

Passage 358 communicates the discharge side of pump 24 with the bore 376 of the manual valve 350.

Flow is conducted through internal passage 384 to the exit passage 354 which distributes the flow to passages 314, 324, 326 and 356. As in previously described conditions, passage 356 pressurizes directly the forward clutch 36 after passing through the orifice 37. Passage 120 pressurizes chamber 118 of pressure regulator valve 104. A force is produced on the face of land 108 in opposition to the force of the variable force solenoid 100.

Within the manual valve 350 flow passes through the internal passage 382 along the bore 376 to the exit passage 352, which dircts flow through passage 320 into the chamber 318 and through passage 332 into chamber 330 of the second ON/OFF valve 300. When chamber 330 is pressurized, valve 300 is turned OFF and spool 302 is moved in the left-hand direction for the position shown in FIG. 2. When this occurs, land 306 is brought into registry with the end of duct 324 and flow in that duct is closed. However, chamber 318 then communicates with chamber 290 of the first ON/OFF valve 270 by way of duct 292. Passage 198 communicates chamber 290 with chamber 196 of the first solenoid valve. Whether solenoid 180 is ON or OFF, spool 184 is moved by spring 208 to the position shown in FIG. 2 and chamber 196 is in communication with the apply chamber 62 of the intermediate servo 54 by way of passage 200. Since the second solenoid valve is not pressurized, solenoid 220 may be ON or OFF without altering the result.

Although chamber 312 is pressurized by duct 314, valve 300 is OFF because an equal but oppositely directed force is produced on the face of the land 310 to that of the land 304 and the force of the spring 316. Passage 326 is closed by land 308 of valve spool 302.

Passage 116 again communicates the discharge side of pump 24 through the orifice 142 with chamber 144 of the solenoid pressure regulator valve 130. A reduced solenoid pressure flow exits chamber 144 through the passage 148, which is closed by land 310.

With manual valve 350 set at the 1 position, the transmission will operate at the low speed ratio when the forward clutch 36 and the low-reverse servo 84 are pressurized. To produce this result, solenoids 180 and 220 are OFF and ON/OFF valves 270 and 300 are ON.

Passage 358 communicates the discharge side of pump 24 with bore 376 of the manual valve 350. Flow exits valve 350 through passage 354, but passage 352 is closed from communication with bore 376 by land 367. Chamber 312 of ON/OFF valve 300 is pressurized through passage 314 and a pressure force is produced on the face of land 304 acting in opposition to the force of the spring 316. The pressure force exceeds the spring force and the spool 302 is moved in the right-hand direction to the ON position. Accordingly, communication is open between passage 324 and passage 292. Chamber 323 of valve 300 is pressurized through passage 326 and communication is open between passages 326 and 244 because land 308 is displaced from its blocking position. Chamber 242 of the second solenoid valve allows communication between passage 242 and passage 248. Passage 248 is closed by land 276 when ON/OFF valve 270 is moved leftwardly.

The leftward shifting of valve spool 272 occurs when passage 160 is supplied from the discharge side of pump 24 through supply passage 358, crossover passage 360, bore 376 and internal passages 378, 380. Chamber 162 of the pressure modulator valve 150 is thereby pressurized and flow exits the valve through passage 164 by which chamber 236 of the second solenoid valve is pressurized. Because solenoid 220 is OFF, the net pressure forces on lands 226 and 260 add to the force of spring 250 whereby chamber 236 is in communication with chamber 282 of the first ON/OFF valve 270 through the passage 284. In this way, a pressure force is developed on the face of land 276 acting in opposition to the force of spring 274. The pressure force exceeds the force of the spring, hence ON/OFF valve 270 is biased to the ON condition. The exit passage 238 from chamber 236 intersects passage 240, through which hydraulic fluid pressure is applied to the low reverse servo 84.

A fourth passage supplied from exit passage 354 of manual valve 350 is passage 356, which pressurizes the forward clutch 36 through the orifice 37. As in other selector settings, passage 120 pressurizes chamber 118 at the end of the line pressure regulator valve 104 and produces a force on the face of land 108 acting in opposition to the variable force solenoid 100. Passages 116 and 140 direct hydraulic pressure from the discharge side of pump 24 through the orifice 142 and into the chamber 144 of the solenoid pressure valve 130. A pressure drop occurs across orifice 142 and fluid at reduced solenoid pressure exits chamber 144 through passage 148. ON/OFF valve 300 allows the solenoid pressure to flow from passage 148 into passage 254, which directs flow into chamber 210 of the first solenoid valve after passing through orifice 214. Similarly, passage 256 pressurizes chamber 252 of the second solenoid valve. However, because both solenoids 180 and 220 are OFF, lands 216, 260 close chambers 210 and 252, respectively.

With the manual valve placed at the 1 position, the transmission is disposed for intermediate speed ratio when the apply chamber 62 of the intermediate servo 54 and the forward clutch 36 are pressurized. The hydraulic control system will produce this effect when ON/OFF valve 270 is OFF, valve 300 is ON, solenoid 180 is OFF and solenoid 220 is ON.

Again, the discharge side of pump 24 communicates with the manual valve 350 through the passage 358. Flow exits the manual valve through passage 354, but passage 352 is closed by land 366. The forward clutch 36 is pressurized through passage 356 directly from passage 354. ON/OFF valve 300 is turned ON when chamber 312 is pressurized through passage 314. A pressure force is produced on a face of land 304 in opposition to the force of spring 316, which causes the spool 302 to move in the right-hand direction of FIG. 2. When this occurs, passage 324 is in communication with passage 292 through chamber 319 of the valve 300. Chamber 290 of the first ON/OFF valve 270 is pressurized by passage 292. Flow exits chamber 290 by way of passage 198, which pressurizes chamber 196 of the first solenoid valve. Because solenoid 180 is OFF, communication is open between passage 198 and passage 200, which pressurizes the apply chamber 62 of the intermediate servo 54.

Because of the ON position of valve 300, passage 326 is in communication with passage 244, which directs flow through the orifice 246 and into chamber 242 of the second solenoid valve. But because solenoid 220 is ON, land 228 closes off passage 242 and there is no exit flow.

A pressure force is produced on the face of land 108 when chamber 118 of the line pressure regulator valve 104 is pressurized through passage 120. The pressure force acts in opposition to the force of the variable force solenoid 100.

Passages 116 and 140 communicate the discharged side of pump 124 with chamber 144 through the orifice 142. Fluid at a reduced solenoid pressure exits chamber 144 through passage 148. ON/OFF valve 300 opens communication between passage 148 and passages 212, 234. Passage 212 directs flow through the orifice 214 into chamber 210 of the first solenoid valve, but land 216 closes off chamber 210. Similarly, chamber 252 of the second solenoid valve is pressurized through passage 256, but land 260 closes off chamber 252 from exiting flow. Fluid at solenoid pressure is supplied by passages 234 and 194 to chambers 232 and 192 at the ends of the second and first solenoid valves, respectively. Pressure forces are produced on the faces of lands 226 and 186, which forces act in opposition to the force of springs 250 and 208, respectively.

For operation with the manual valve in the 1 range, a pressure switch 390 connected to passage 386 or a potentiometer (not shown) mounted on the manual valve will produce a signal if pressure to the reverse-high clutch 38 is lost. The signal will cause the micropressure to turn ON solenoid 220. This will enable a more moderate shifting from the direct speed ratio if, for example, pressure is lost while driving down a hill and engine braking is required. In this case, the manual valve can be shifted from the D range directly to the 1 range. The transmission will shift from the third speed through the second speed ratio to first gear.

From the foregoing description and with reference to the schedule of FIG. 3, it can be seen that low speed ratio, intermediate speed ratio, direct speed ratio and reverse speed ratio can be produced by moving the manual valve to the desired setting, even if power and control from the control unit of the microprocessor is lost. Upon loss of electronic control, the microprocessor defaults to a zero current condition, which action effectively turns OFF solenoids 180, 220 and 100. In the event of loss of electronic control, in order to produce low speed ratio operation, the manual valve is placed at the 1 setting and the hydraulic control system will produce the low speed ratio as has been described. By shifting the manual valve to the 2 position, the intermediate speed ratio can be produced because solenoids 180 and 220 can be in the OFF condition and the transmission will operate at the intermediate speed ration. Upon loss of electronic control, the direct speed ratio is produced when the manual valve is placed at the D position. Similarly, to produce the reverse speed ratio, the manual valve is set at the R position. Reverse speed ratio is possible because solenoids 180 and 220 can be OFF for this mode of operation.

Having thus described preferred embodiments of my invention, what I claim and desire to secure by U.S. Letters Patents is:

1. In a control system for an automatic gear change transmission adapted to deliver torque from a driving member to a driven member, having gear elements forming plural torque delivery paths between the driving and driven members and a plurality of clutch and brake means for controlling the relative motion of the gear elements to provide a plurality of forward and reverse speed ratios comprising:
   a fluid pump;
   a manual selector valve moveable among a plurality of positions corresponding to the forward and reverse drive ranges and communicating with the discharge side of said pump;
   first and second ON/OFF valves operating in response to the position of said manual valve for selectively pressurizing outlet chambers formed therein;
   an electronic control adapted to provide electrical output signals to produce the selected speed ratio of operation;
   first and second solenoid valves communciating with the outlet chambers of said first and second ON/OFF valves, adapted to produce automatic shifting among the forward drive ratios of the transmission by selectively pressurizing the clutch and brake means according to the electrical output signals received by said solenoid valves from said electronic control and the effect of pressure received from the outlet chambers of said first and second ON/OFF valves, whereby shifting among any of the drive ratios can occur if said electronic control produces no output signal by manually moving said manual valve to the desired drive range position.

2. The control system according to claim 1 wherein the plurality of drive range positions of said manual selector valve includes an automatic-shift forward position whereat automatic shifting can occur among first, second and third forward speed ratios, a first manual forward drive range position whereat shifting can occur between first and second forward speed ratios, a second manual forward drive range position whereat second speed ratio is produced, a reverse drive position whereat a reverse speed ratio is produced, a park position wherat the driven member is locked against rotation and a neutral position whereat the driven member is disconnected from the driving member.

3. The control system according to claim 2 wherein the transmission is shifted to the second speed ratio when said manual valve is moved to the second manual forward drive range position and to the park, neutral and reverse speed ratio when said manual valve is moved to the drive range position corresponding thereto regardless of whether said solenoid valves are controlled by an electrical signal from said electronic control.

4. The control system according to claim 2 further comprising a pressure modulator valve having an inlet passage communicating with the outlet side of said manual valve when said manual valve is set at the first manual forward drive range position, said modulator valve further including:
   a valve bore;
   a valve spool slidable within said valve bore between first and second positions, biased by a spring to the first position and having an outlet passage communicating with an inlet passage of said second solenoid valve.

5. The control system according to claim 1 further comprising clutch means whose engagement is required for forward drive wherein said manual valve, when set at any forward drive range position, connects the discharge side of said pump with said clutch means.

6. The control system according to claim 1 wherein said ON/OFF valves each further include:
   a valve bore;
   a valve spool slidable within said valve bore, biased by a spring to an OFF position and movable to an ON position when a pressure force opposing the force of the spring exceeds the spring force.

7. The control system according to claim 1 wherein said first and second solenoid valves each further include:
a valve bore;
a valve spool slidable within said valve bore biased by a spring to an OFF position, the spool having differential area surfaces formed thereon upon which oppositely directed pressure forces are developed when pressure is applied thereto and movable to an ON position upon receipt of an electronic control output signal by a solenoid that controls the position of the valve spool, whereby the valve directs pressurized hydraulic fluid to the clutch and brake means that control the gear elements of the selected gear ratio.

8. The control system according to claim 7 wherein said solenoid valves each further include:
first actuating means adapted to receive a signal from said electronic control, which signal energizes said actuating means and causes depressurization of the larger differential area surface, the pressure force on the smaller differential area exceeding the force of the spring whereby said spool is biased to an ON position.

9. The control system according to claim 1 further including a line pressure regulator valve communicating with the outlet side of said pump, adapted to regulate the pressure of the fluid exiting said valve according to the control of said electronic control.

10. The control system according to claim 9 wherein said line pressure regulator valve further includes:
a valve bore;
a valve spool slidable within said valve bore, biased by a spring to an ON position, the spool having differential area surfaces formed thereon upon which oppositely directed pressure forces are developed when pressure is applied thereto, the net pressure force on the differential areas biasing said spool to an OFF position; and
second actuating means adapted to receive a signal from said electronic control, which signal energizes said second actuating means and causes a force of variable magnitude to be applied to said valve spool, the force varying according to variations of a sensed operating parameter of the transmission whereby said spool is biased to the ON position.

11. The control system according to claim 9 further including a solenoid pressure regulator valve connected with the discharge side of said pump through an orifice wherein a pressure drop occurs, having a valve spool movable between a first and second position, biased by a spring to the first position whereat said valve communicates its inlet side to the inlet passage of said second ON/OFF valve.

* * * * *